United States Patent
Levinson

(10) Patent No.: US 9,065,571 B2
(45) Date of Patent: *Jun. 23, 2015

(54) MODULAR CONTROLLER THAT INTERFACES WITH MODULAR OPTICAL DEVICE

(75) Inventor: Frank H. Levinson, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 1478 days.

This patent is subject to a terminal disclaimer.

(21) Appl. No.: 10/929,978

(22) Filed: Aug. 30, 2004

(65) Prior Publication Data

US 2005/0047778 A1    Mar. 3, 2005

Related U.S. Application Data

(63) Continuation-in-part of application No. 10/866,483, filed on Jun. 11, 2004.

(60) Provisional application No. 60/498,825, filed on Aug. 29, 2003, provisional application No. 60/498,966, filed on Aug. 29, 2003, provisional application No. 60/499,047, filed on Aug. 29, 2003.

(51) Int. Cl.
*H04B 10/50* (2013.01)
*H04B 10/40* (2013.01)

(52) U.S. Cl.
CPC .................................... *H04B 10/40* (2013.01)

(58) Field of Classification Search
USPC .......................................................... 398/135
See application file for complete search history.

(56) References Cited

U.S. PATENT DOCUMENTS

| | | | |
|---|---|---|---|
| 4,684,245 A * | 8/1987 | Goldring | 356/41 |
| 4,689,795 A | 8/1987 | Yoshimoto et al. | |
| 5,042,042 A | 8/1991 | Hori et al. | |
| 5,237,441 A * | 8/1993 | Nhu | 398/136 |
| 5,383,208 A | 1/1995 | Queniat | |
| 5,644,654 A | 7/1997 | Onokera | |
| 5,787,114 A * | 7/1998 | Ramamurthy et al. | 375/221 |
| 5,812,572 A | 9/1998 | King et al. | |
| 5,844,928 A | 12/1998 | Shastri | |
| 5,956,168 A | 9/1999 | Levinson et al. | |

(Continued)

FOREIGN PATENT DOCUMENTS

| CA | 2528989 | 12/2008 |
|---|---|---|
| CA | 2528989 | 11/2009 |

OTHER PUBLICATIONS

SFF Committee "Proposed Specification for GBIC", Rev 5.5, Edited by R. Snively, Sep. 27, 2000.*

(Continued)

*Primary Examiner* — Shi K Li
(74) *Attorney, Agent, or Firm* — Maschoff Brennan

(57) ABSTRACT

A controller for optical components. A controller includes an analog interface that is configured to connect to an optical component external to the controller. The analog interface is able to deliver and/or receive signals to and/or from the optical component. The controller includes a digital interface that is able to connect to a memory external to the controller. The digital interface may receive a digital representation of operating characteristics of the optical component. The controller is configured to deliver and/or receive signals to and/or from the optical component based on the digital representation of operating characteristics.

20 Claims, 5 Drawing Sheets

(56) References Cited

U.S. PATENT DOCUMENTS

| | | | |
|---|---|---|---|
| 6,043,443 | A | 3/2000 | Doran et al. |
| 6,313,459 | B1 | 11/2001 | Hoffe |
| 6,385,226 | B2 * | 5/2002 | McMinn et al. ............. 372/50.1 |
| 6,430,201 | B1 * | 8/2002 | Azizoglu et al. ............. 370/535 |
| 6,554,492 | B2 | 4/2003 | Gilliland et al. |
| 6,667,998 | B1 | 12/2003 | Lo et al. |
| 6,734,959 | B2 | 5/2004 | Griffiths et al. |
| 6,760,353 | B2 | 7/2004 | Wang |
| 6,832,052 | B1 * | 12/2004 | Marmur ........................ 398/175 |
| 6,842,711 | B2 | 1/2005 | Liu et al. |
| 6,894,266 | B2 | 5/2005 | Richard et al. |
| 6,931,464 | B1 * | 8/2005 | Reeves ............................ 710/62 |
| 6,934,310 | B2 | 8/2005 | Brophy |
| 7,062,164 | B2 * | 6/2006 | Ames et al. .................... 398/25 |
| 7,127,648 | B2 * | 10/2006 | Jiang et al. .................... 714/715 |
| 7,139,488 | B1 | 11/2006 | Mituhashi |
| 7,151,894 | B2 | 12/2006 | Fan et al. |
| 7,166,826 | B1 | 1/2007 | Kunst |
| 7,206,392 | B2 | 4/2007 | Fingler et al. |
| 7,215,891 | B1 * | 5/2007 | Chiang et al. ................. 398/137 |
| 7,286,756 | B1 | 10/2007 | Marshall et al. |
| 7,299,290 | B2 | 11/2007 | Karpoff |
| 7,317,689 | B1 * | 1/2008 | Liu ................................ 370/246 |
| 7,463,674 | B2 * | 12/2008 | Woolf et al. .................. 375/219 |
| 2002/0027688 | A1 | 3/2002 | Stephenson |
| 2002/0149821 | A1 * | 10/2002 | Aronson et al. .............. 359/152 |
| 2002/0190666 | A1 * | 12/2002 | Sakamoto et al. ............ 315/291 |
| 2003/0023780 | A1 * | 1/2003 | Husted et al. .................. 710/15 |
| 2004/0033079 | A1 * | 2/2004 | Sheth et al. ................... 398/135 |
| 2004/0052299 | A1 | 3/2004 | Jay et al. |
| 2004/0062245 | A1 | 4/2004 | Sharp et al. |
| 2004/0136729 | A1 | 7/2004 | Robinson et al. |
| 2004/0228627 | A1 | 11/2004 | Alana et al. |
| 2006/0154387 | A1 | 7/2006 | Mueller |

OTHER PUBLICATIONS

App Note AN-2025, Finisar Corporation, 1998.*
"Broadcom Debuts 10-gigabit Ethernet/Fiber Channel Transceiver", Downloaded from Entrepreneur.com, LAN Product News, May 1, 2003.*
U.S. Appl. No. 11/118,589, filed Apr. 29, 2005, Levinson.
U.S. Appl. No. 10/866,483, filed Jun. 11, 2004, Levinson.
U.S. Appl. No. 10/929,178, Jan. 4, 2010, Office Action.
"The 12C-Bus Specification" version 2.1, Jan. 2000, Phillips Semiconductors.
E. Yeh et al., "Introduction to TCP/IP Offload Engine (TOE)", Version 1.0, Apr. 2002, 10 Gigabit Ethernet Alliance, www.10gea.org.
Finisar (App Note AN-2025, Finisar Corporation, 1998).
"Gigabit Interface Converter (GBIC)" Edited by R. Snively, SFF Committee, Sep. 27, 2000.
Xenpak 10 gigabit Ethernet Transceiever Pakage, Issue 3.0, Sep. 18, 2002.
Curvefitting Toolbox User's Guide. Version 1. The MathWorks, Inc. 2002.
U.S. Appl. No. 10/929,178, Dec. 14, 2007, Office Action.
U.S. Appl. No. 10/929,178, Jul. 25, 2008, Office Action.
U.S. Appl. No. 10/929,178, Dec. 31, 2008, Office Action.
U.S. Appl. No. 10/929,178, Aug. 25, 2009, Office Action.
U.S. Appl. No. 11/118,589, Mar. 17, 2008, Office Action.
U.S. Appl. No. 11/118,589, Aug. 1, 2008, Office Action.
U.S. Appl. No. 11/118,589, Apr. 8, 2009, Office Action.
U.S. Appl. No. 11/118,589, Nov. 4, 2009, Office Action.
U.S. Appl. No. 10/866,483, Sep. 27, 2007, Office Action.
U.S. Appl. No. 10/866,483, Aug. 15, 2008, Office Action.
U.S. Appl. No. 10/866,483, Apr. 1, 2009, Office Action.
U.S. Appl. No. 10/866,483, Dec. 17, 2009, Office Action.
U.S. Appl. No. 10/929,923, Jan. 3, 2008, Office Action.
U.S. Appl. No. 10/929,923, Jun. 18, 2008, Office Action.
U.S. Appl. No. 10/929,923, Dec. 15, 2008, Office Action.
U.S. Appl. No. 10/929,923, Jul. 31, 2009, Office Action.
U.S. Appl. No. 10/929,923, Jan. 15, 2010, Office Action.
U.S. Appl. No. 10/866,483, Jun. 2, 2010, Office Action.
U.S. Appl. No. 10/929,178, Jun. 16, 2010, Office Action.
U.S. Appl. No. 10/929,923, Jul. 14, 2010, Office Action.
U.S. Appl. No. 10/866,483 Office Action mailed Jan. 6, 2011.
U.S. Appl. No. 10/866,483 Notice of Allowance mailed Jul. 19, 2011.
U.S. Appl. No. 10/929,923 Office Action mailed Apr. 21, 2011.
U.S. Appl. No. 11/118,589 Office Action mailed Sep. 27, 2011.

* cited by examiner

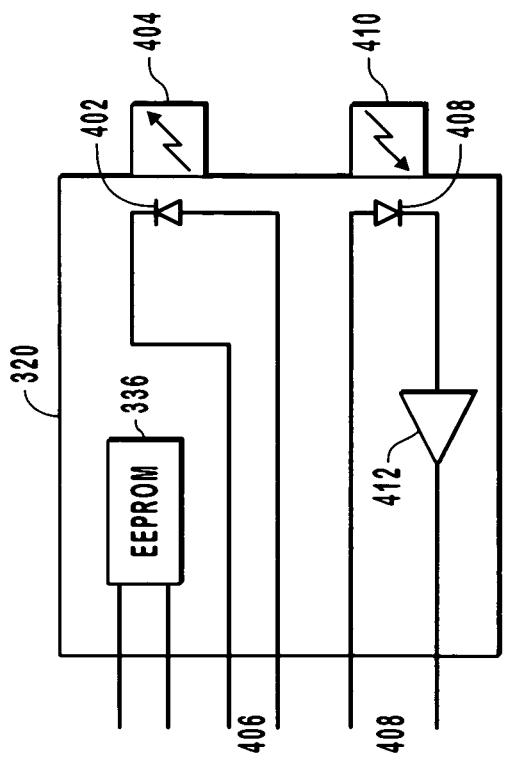
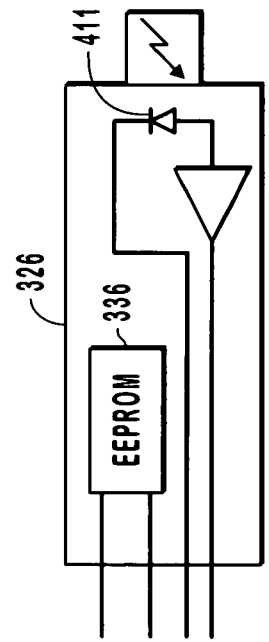
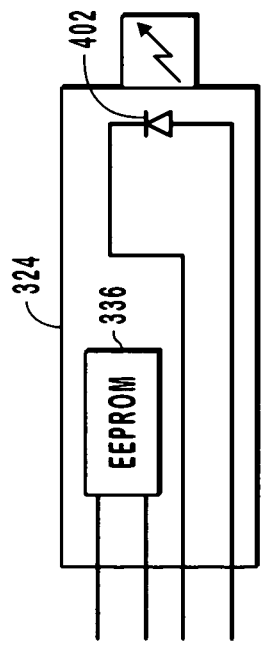
Fig. 4A
Fig. 4B
Fig. 4C

MODULAR CONTROLLER THAT INTERFACES WITH MODULAR OPTICAL DEVICE

CROSS-REFERENCE TO RELATED APPLICATIONS

This application claims the benefit and is a continuation-in-part of U.S. Utility application Ser. No. 10/866,483, titled Modular Optical Device That Interfaces With an External Controller, filed Jun. 11, 2004 and claims the benefit of U.S. Provisional Application Nos. 60/498,825, titled Modular Controller That Interfaces With Modular Optical Device, filed Aug. 29, 2003, 60/498,966, titled Testing and Storing Tuning Information in Modular Optical Devices, filed Aug. 29, 2003 and 60/499,047, titled Computer System With Modular Optical Devices, filed Aug. 29, 2003, which are incorporated herein by reference.

BACKGROUND OF THE INVENTION

1. The Field of the Invention

The invention generally relates to fiber-optic networking components. More specifically, the invention relates to fiber-optic components that allow for optical networking hardware to be implemented on computer systems.

2. Description of the Related Art

Computer processing power and speed continues to advance at an amazing rate. However, the continued growth of power and speed is not unexpected. In 1965, Gordon Moore predicted that the number of transistors, and hence the processing power and speed of computer chips, would double every couple of years. This predicts an exponential growth in processing power and speed. This prediction has been referred to as Moore's Law. Moore's law has generally held true.

In a modern computer, the microprocessor has several support components. For example, the microprocessor is connected to memory where the memory is used to store data, computer instructions and the like. For processing power and speed increases to be useful in a microprocessor, the speed of supporting components should scale with the processing power and speed of the microprocessor. For example, if memory connected to the processor is too slow, the processor must remain idle while fetching instructions or data from the memory. Thus, the increased processing power and speed of the processor is wasted.

Computer microprocessors and much of the supporting circuitry is based on silicon chip technology. At present, microprocessors and the supporting circuitry have generally scaled fairly well together. Best estimates also suggest that silicon based computers still have 10 to 15 years of processing power and speed increases if following Moore's Law.

One especially useful implementation of modern computers involves the interconnection of computers for transferring and sharing data between the computers. A small or moderate number of computers may be grouped together in a given location. This type of network is known as a local area network (LAN). LANs may be connected to other LANs to form a wide area network (WAN). An example of this type of configuration is shown in FIG. 1 which illustrates a topology 100 with a number of interconnected computer clients on LANs and WANs. Exemplary LANs include home networks, local office network and the like. Exemplary WANs include interconnected office LANs and the ubiquitous Internet.

Referring now to FIG. 1, a first LAN 102 includes a number of clients 104 interconnected by router 106 (also referred to herein as a "hub 106"). The LAN 102 in FIG. 1 uses copper wire based Ethernet, such as the protocol specified in IEEE 802.3. The LAN 102 is connected to a second LAN 108. The LANs 102 and 108 are connected in the example shown in FIG. 1 by routers 110 that are designed to send and receive large amounts of data. The routers 110 may be for example Huge Fast Routers (HFRs) and the like. In the example shown in FIG. 1, the routers 110 are interconnected using fiber-optic communications as shown by the fiber-optic links 112.

The second LAN 108 includes a number of clients 112. The clients 112 may be similar to the clients 104 in the first LAN 102. The second LAN 108 also includes a storage area network (SAN) 114 and a network of servers 116. The SAN 114 and network of servers 116 provide centralized locations for data that may be used by clients 104, 112 on the first LAN 102 and second LAN 108. Accessing data on the network of servers 116 and SAN 114 should ideally be transparent to users at the client computers 104 and 112. In other words, a user at a given client in the topology 100 should not experience any noticeable difference when accessing data on either any other client in the topology, the network of servers 116, or the SAN 114 as compared to when accessing data stored on the given client itself.

Referring now to the first LAN 102 for ease of explanation, the clients 104, as mentioned above, are interconnected through a hub 106 using an Ethernet protocol. A common Ethernet protocol is 100 BT that runs at 100 megabits per second (Mb/s). Alternatively, the clients 104 may be interconnected using a wireless protocol such as 802.11g which runs at around 56 Mb/s Currently, there also exist systems that operate at 1000 Mb/s. These systems are called Gigabit Ethernet systems. Ethernet systems that use copper wire are quickly approaching their useful limit. As the data rate increases, the useful distance that data may be transmitted across the copper wire decreases. Alternatively, the cables used for interconnecting computers become expensive or difficult to install.

Likewise, wireless Ethernet alternatives are limited by frequency. Various regulatory organizations such as the FCC limit the frequency range in which wireless signals may be transmitted. Limited frequency range translates directly into limited bandwidth. Consequently, Ethernet applications based on copper wire or wireless implementations have limited data rates.

Some experts have suggested that Gigabit Ethernet is as fast as copper wire systems will operate efficiently. Wireless systems are also quickly approaching their limits as far as bandwidth is concerned. Thus, while silicon chip technology still has ample amounts of growth potential, it is anticipated that the conventional network systems that commonly interconnect silicon chip systems have reached (or are quickly reaching) their maximum potential.

As mentioned previously, modern computer systems use network information. In fact, much of the data used by a computer system is typically stored away from the computer system on a network device. As noted above, it is desirable that fetching of network information from the network be transparent to a computer user. However, if network speeds are significantly lower than computer system speeds, fetching the data will not be transparent. Thus, faster networks are needed to scale with computer processing speed as computer processing speed increases.

As shown in FIG. 1, LANs may be interconnected using fiber-optics such as the fiber-optic links 112 between the routers 110. Fiber-optic networks can operate at much higher data rates than copper wire or wireless networks. However, while the fiber-optic networks can transmit data between LANs at high speeds, a bottleneck still remains because of the copper wire or wireless based connections at the LANs themselves. Further, the routers interconnecting various LANs (as well as the routers at the LANs themselves) implement a function where the router collects an entire subset of data before transmitting it to a target network or computer system. This is commonly referred to as store and forward. This results in a bottleneck where all of the data for a packet or other subset of data is collected before forwarding to the next point (such as a router) in a network. Thus, the more conventional routers (whether copper wire or fiber based) that are used in a network, the more delay is caused by the cumulative effect of the store and forward operations.

Fiber-optic LANs, where each computer has a fiber-optic connection for connecting to the LAN, help to eliminate some of the problems described above. To connect to a fiber-optic LAN, each computer has a transceiver. The transceiver includes a laser for generating an optical signal. The laser is connected in the transceiver to a laser driver. The laser driver is further connected to other control circuitry in the transceiver. The transceiver receives a digital signal. The digital signal is processed by the control circuitry to improve the quality of the signal such as by removing noise and jitter. The laser driver converts the processed signal to an analog driving signal for modulating the laser output with the digital signal.

The transceiver also includes a photodiode that is included in circuitry for receiving optical signals and converting them to digital signals. The photodiode is connected to a transimpedance amplifier to boost the strength of the electrical signal produced when photons from the optical network signal strike the photodiode. Following the transimpedance amplifier is a post amplifier. The post amplifier further amplifies and feeds the signal from the transimpedance amplifier to other circuitry that is included to process and convert the electrical signal to a digital signal for use by a computer on which the transceiver is installed.

Transceivers are more expensive to manufacture than traditional 802.3 copper wire interfaces and thus have not widely been implemented on computers within a LAN. Thus copper or wireless LANs continue to be those most used. Because copper and wireless based communications will soon be the bottleneck in LAN connected computer system, it would be useful to provide methods and apparatus to lessen the cost of implementing fiber-optic communications on computer systems.

BRIEF SUMMARY OF THE INVENTION

One embodiment includes a controller for an optical component. The controller includes an analog interface that can connect to the optical component. The optical component is external to the controller. The analog interface is useful for delivering and/or receiving signals to and/or from the optical component. The controller includes a digital interface that is able to connect to a memory external to the controller. The digital interface allows for the reception of a digital representation of operating characteristics of the optical component. The controller is able to deliver and/or receive signals to and/or from the optical component based on the digital representation of operating characteristics.

Another embodiment includes a controller for driving a laser. The controller includes an analog interface that can connect to a laser external to the controller. The analog interface allows for the delivery of driving signals to the laser. The controller further includes a digital interface that may be connected to a memory external to the controller. The digital interface allows for the reception of a digital representation of operating characteristics of the laser. The controller is able to deliver driving signals to the laser based on the digital representation of operating characteristics.

Another embodiment includes a controller for a photodiode. The controller includes an analog interface that is able to connect to a photodiode external to the controller. The analog interface allows for the reception of signals from a photodiode. A digital interface and is also included in the controller. The digital interface is configured to connect to a memory external to the controller. The digital interface allows for the reception of a digital representation of operating characteristic of the photodiode. The controller is able to receive signals from the photodiode based on the digital representation of operating characteristics.

Advantageously, embodiments of the present invention may be installed in computer equipment such that optical components can be randomly matched with a controller. By storing operating characteristics in a memory, the controller can retrieve the operating characteristics and adjust itself appropriately to allow for proper operation of the optical modules. Additionally, calibration data can be stored in memory so that during use, real-time information such as received optical power, may be read out of the memory and appropriately presented to the user. This allows for economical and efficient manufacturing of optical network hardware in computer devices.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments and are not therefore to be considered limiting of its scope, the invention will be described and explained with additional specificity and detail through the use of the accompanying drawings in which:

FIG. 4A illustrates an optical module including laser and photosensitive device;

FIG. 4B illustrates an optical module including a laser;

FIG. 4C illustrates an optical module including a photosensitive device;

DETAILED DESCRIPTION OF THE INVENTION

Figure 1:
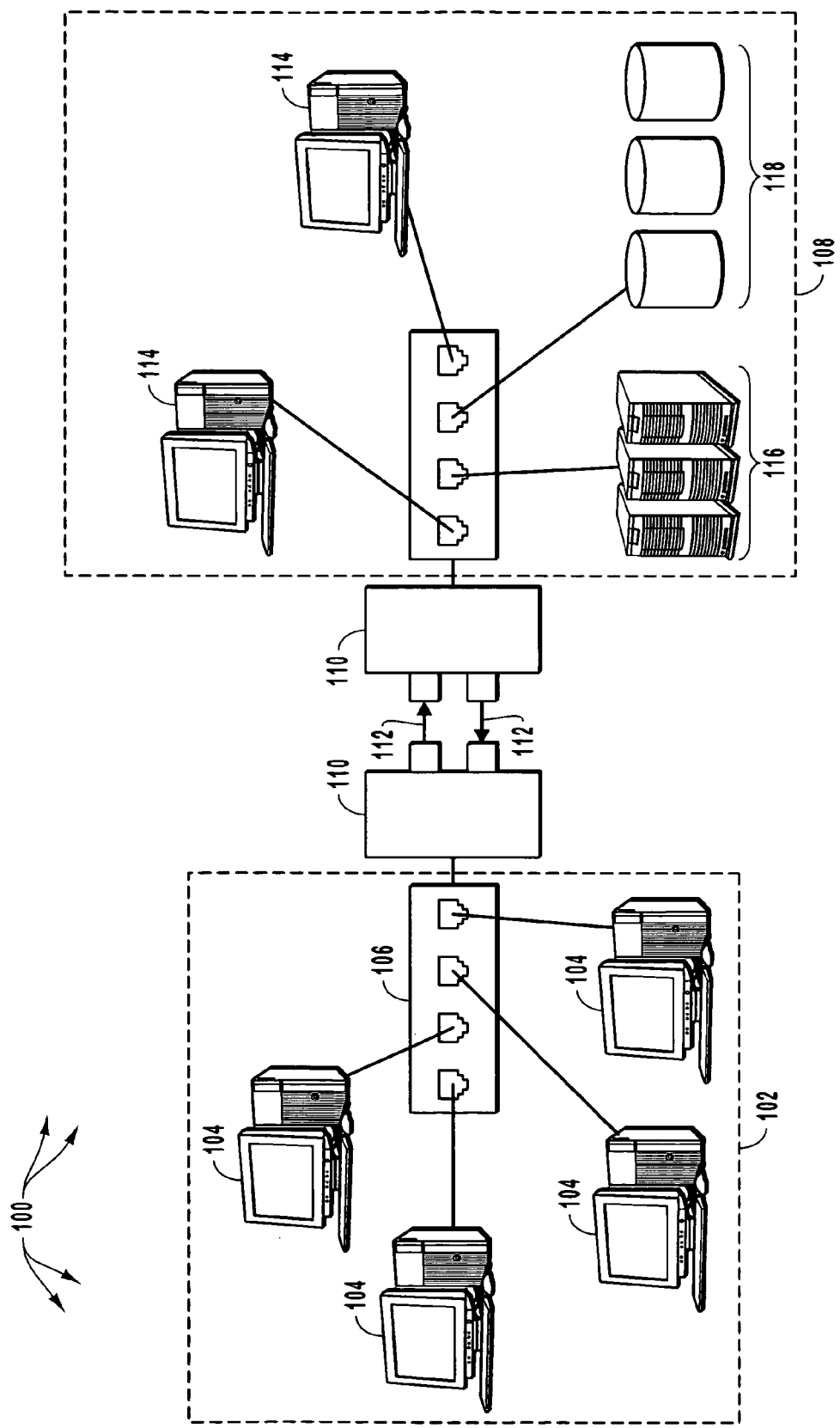
FIG. 1 illustrates an exemplary topology where clients are interconnected through local area networks and wide area networks.
Figure 2:
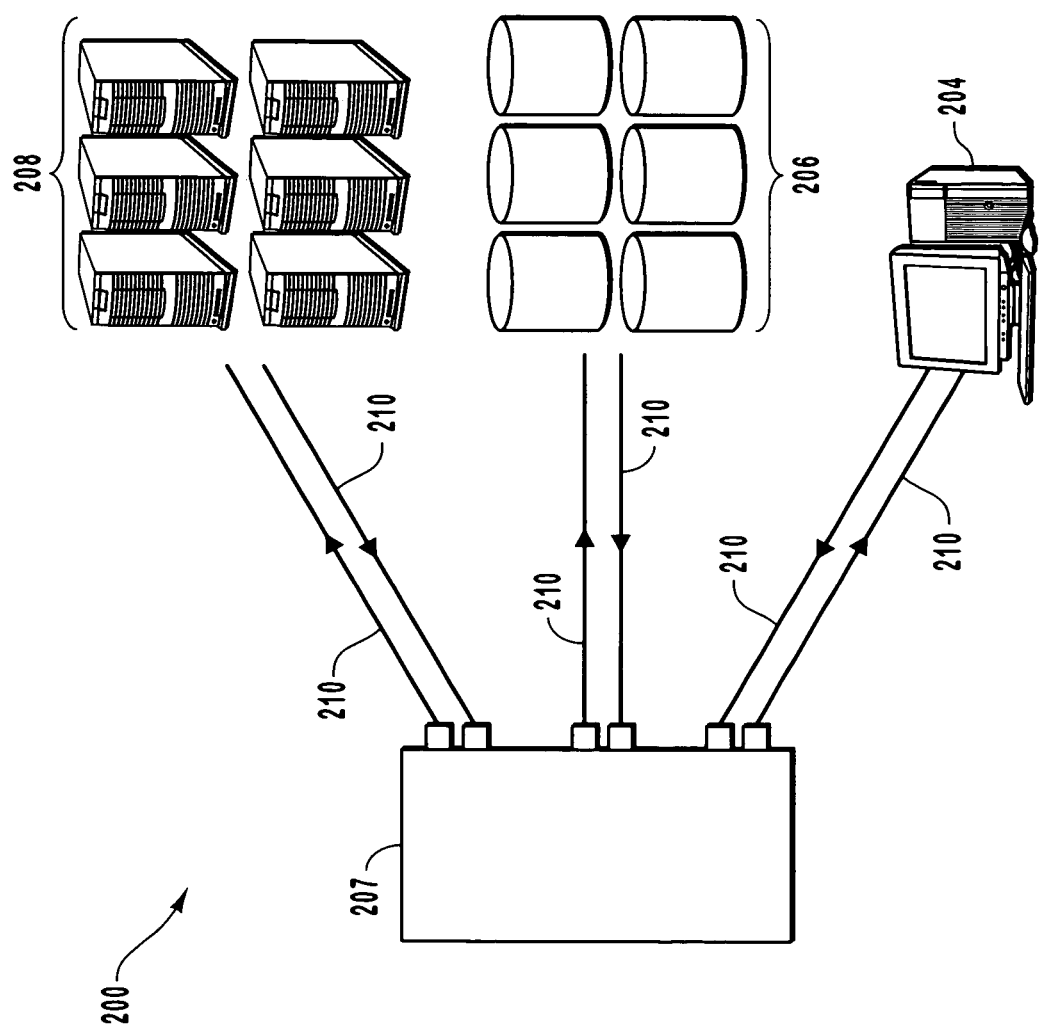
FIG. 2 illustrates a local area network where various components are interconnected with fiber-optic interconnection.

Referring now to FIG. 2, an exemplary topology where embodiments of the present invention may be practiced is shown. FIG. 2 illustrates a topology 200 that in the example shown is a LAN. The LAN includes a fiber-optic router 202. In the topology 200, the fiber-optic router 202 interconnects a network client 204 to network storage (such as a SAN) 206 and a bank of servers 208. The network client 204 includes a fiber-optic interface for connecting to the fiber-optic router 202 using fiber-optic connections 210. The network storage 206 and bank of servers 208 are also connected to the fiber-optic router 202 via other fiber-optic connections 210. The bandwidth limitations of copper wire based Ethernet and wireless Ethernet connections are obviated by using fiber-optic interconnections.

Commonly available fiber-optic connections and standards currently allow for various different data rates. One standard is Fast Ethernet. Fast Ethernet operates at 100 Mb/s. Another standard is Gigabit Ethernet. Gigabit Ethernet operates at 1000 Mb/s. Yet another standard is 10 Gigabit Ethernet. 10 Gigabit Ethernet operates at 10,000 Mb/s. Fast Ethernet and Gigabit Ethernet are commonly used when clients on a network communicate with each other or when clients communicate with servers.

Yet another standard is SONET. Currently, SONET specifies a number of different data rates including 51.84 Mb/s, 155.52 Mb/s, 622.08 Mb/s, 2.488 gigabits per second, 9.953 gigabits per second, and 39.813 gigabits per second. Yet another standard is Fibre Channel. Fibre Channel typically operates at speed of at least 100 MB/s. SONET and Fibre Channel are presently used to communicate with storage such as network storage 206 on a network.

Another optical standard is Infiniband. Infiniband generally operates at 2500 Mb/s. Infiniband is often used for clustering. Clustering involves the use of several computer systems in a distributed computing environment. Thus, computing tasks are divided up among the computer systems in the cluster.

Additionally, fiber-optic networks have ample room for scaling to higher frequencies as needed. Such scaling may be accomplished for example by increasing transmission speeds. Alternatively, scaling may be accomplished by using multiplexing schemes where multiple wavelengths of light are transmitted on a network. Each wavelength of light provides a stream of data. To scale lap the network bandwidth, one or more additional wavelengths are transmitted onto the network.

Figure 3:
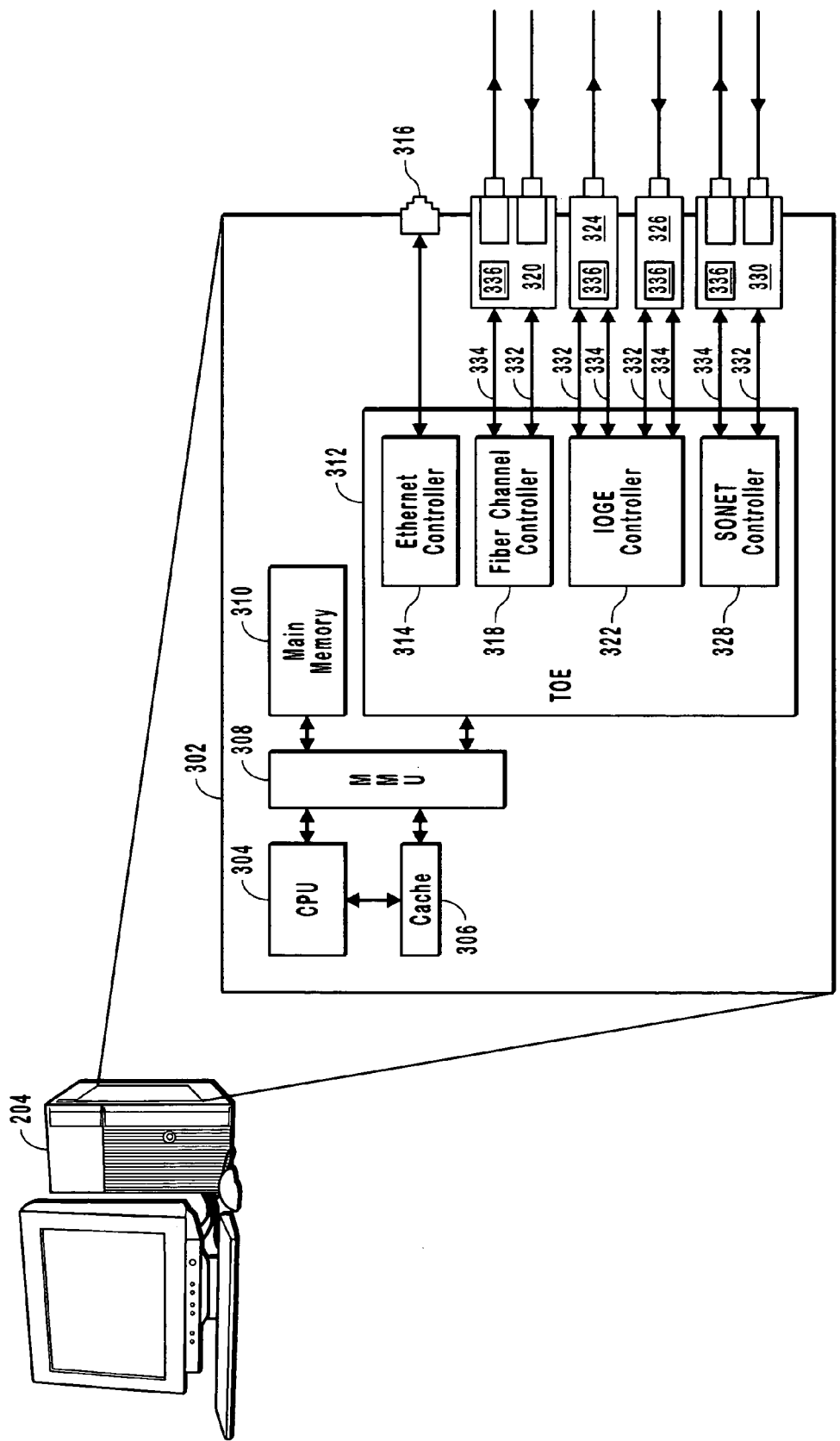
FIG. 3 illustrates an exemplary network client with fiber-optic networking capabilities.

Referring now FIG. 3, one embodiment of the network client 204 is illustrated. Notably, while the network client 204 is shown as a general purpose computer, other devices may implement the functionality of the network client including but not limited to personal digital assistants (PDAs), storage devices, servers, hubs, routers, switches, and the like. A typical network client such as network client 204 includes a motherboard 302 where various components are mounted. Generally, a network client includes a central processing unit 304. The central processing unit 304 is attached to cache memory 306. The cache memory 306 may include instructions that are executed by the central processing unit 304. The cache memory 306 may also include data generated by processes on the central processing unit 304, or data used in processes by the central processing unit 304. The central processing unit 304 and cache memory 306 are attached to a memory management unit 308. The memory management unit 308 controls how data items stored in various memory components in the network client 204 are accessed by the central processing unit 304. Further the memory management unit 308 helps to coordinate how and where data items are stored in the various memory components in the network client 204. Main memory 310 is also coupled to the memory management unit 308. The main memory 310, while not as fast as the cache memory 306, is useful for storing programs or sets of instructions being performed by the central processing unit 304, data items generated by processes in the CPU 304, data items needed for processes being performed by the central processing unit 304, and the like.

The memory management unit 308 is further connected to a Transmission Control Protocol/Internet Protocol (TCP/IP) offloading engine (TOE) 312. TCP/IP is the protocol used by most modern networks including the Internet. The TOE 312 provides support for communications that use the TCP/IP protocol stack. The TOE 312 relieves the central processing unit 304 from having to manage detailed computations and memory moves associated with handling TCP/IP traffic. The TOE 312 is often implemented as a microprocessor or as a field programmable gate array (FPGA). Additionally, the TOE 312 is often fabricated on a silicon wafer chip. There is often unused space on the silicon wafer chips in a conventional TOE 312. Thus, in one embodiment optical controllers are formed as a part of the TOE 312. In other embodiments, the optical controller may be formed on other chips with unused space. Alternatively a chip dedicated to optical controller and other network controller may be implemented on the network client 204.

In one embodiment, several different controllers are implemented on the TOE 312 to support various types of copper wire and optical communications. In the example shown in FIG. 3, an Ethernet controller 314 is connected to an RJ45 jack 316. A Fibre Channel controller 318 is connected to an optical module 320. A 10 gigabit Ethernet controller 322 is connected to a laser module 324, which is a specialized optical module including a laser, and a photosensitive module 326 which is a specialized optical module including a photosensitive device. A SONET controller 328 is connected to an optical module 330.

The fiber-optic controllers 318, 322, 328, each have analog connections 332 and digital connections 334 to the optical modules or lasers and photosensitive modules as appropriate. The analog connections 332 allow analog driving signals to be delivered to, or analog signals to be received from photo modules, lasers, and photosensitive modules as appropriate. Notably, while some of the signals sent to the optical modules, laser modules and photosensitive modules are referred to herein as analog signals, those of skill in the art will understand that these signals are representative of digital signals, and may take the form of square waves typically associated with digital signals. Analog signals to lasers are at a level to cause the laser to output a particular level of optical power. Analog signals received from photosensitive devices such as the photosensitive module correspond to a particular optical power level received by the photosensitive device from an optical signal.

The controllers 318, 322, 328 are shown as implementing a particular protocol or standard (i.e. Fibre Channel 318, 10 Gigabit Ethernet 322, and SONET 328). However, other embodiments of the present invention also contemplate controllers that are able to be used universally. Controllers that are able to be used universally are able to comply with the appropriate standard or protocol depending on the type of optical module, laser module and/or photosensitive module connected to the controller. Alternatively, a controller can recognize the protocol of data received on an optical network such that the controller is caused to conform to the particular standard. In this way, the controllers can be arranged to support those connections that a network client needs while optimizing the number of controllers for each use.

The controllers are connected to optical modules 1320 and 330, laser modules 324, and/or photosensitive modules 326. The connection may be implemented, in one example, by traces on a printed circuit board. The optical modules 320, laser modules 324, and/or photosensitive modules 325 may be mounted to the printed circuit board by soldering or any other appropriate technique. Alternatively, a receptacle may be attached to the printed circuit board such that the optical modules 320 and 330, laser modules 324, and/or photosensitive modules 326 can be installed in the receptacle as pluggable modules.

In the example shown, the optical modules 320 and 330, laser module 324, and photosensitive module 326 each include a memory 336. The memory 336 stores various operating parameters of components within the optical modules 320 and 330, laser module 324, and photosensitive module 326. The digital connections 334 allow for operating parameters stored in the memory 336 on the photo modules, lasers and photosensitive modules to be delivered to the controllers 318, 322, 328. These operating parameters, in one embodiment invention, specify the operating characteristics of devices such as laser diodes and photosensitive devices such as photodiodes. The operating parameters may also or additionally store information about associated electronics such as a transimpedance amplifier coupled to a photosensitive device or connector and fiber characteristics used to optically couple the various modules to other optical connections. These operating characteristics may be specific to an individual laser diode, photodiode or other component. Using principles of embodiments of present invention, calibration data may be gathered when a photo module, laser, photosensitive module and the like are fabricated. Alternatively, components may be sorted when they are fabricated into different ratings categories depending on their performance characteristics. Thus, the operating characteristics stored in the memory 336 may be matched to a component with an appropriate ratings category. This will be discussed in more detail below in conjunction with the description of subsequent figures.

FIGS. 4A, 4B and 4C illustrate various embodiments that include optical modules, laser modules and photosensitive modules constructed in accordance with various principles of the present invention. FIG. 4A illustrates an optical module 320. The optical module 320 includes a laser diode 402. The laser diode 402 is configured to transmit optical signals through an optical port 404 onto an optical network using optical connections such as connections 210 shown in FIG. 2. By way of example, optical connections may include pigtails where a fiber is permanently coupled to the laser diode 402. Alternatively, the optical connections may be SC, LC or other appropriate connectors. Similar optical connections may be implemented for a photodiode 408. The laser diode 402 is connected to an analog interface that includes analog interface pins 406. The analog interface pins 406 are accessible to components and circuitry external to the optical module 320. Illustratively and referring again to FIG. 3, a controller such as the Fibre Channel controller 318 is connected through the analog interface 332 to the analog interface pins 406 (FIG. 4) of the optical module 320.

Referring again to FIG. 4A, the optical module 320 further includes a photodiode 408. The photodiode 408 receives optical signals through an optical port 410. The optical port 410 may be connected to optical connections such as the connections 210 shown in FIG. 2, which as described above, may be fiber pigtails, SC or LC connectors, or other appropriate connectors. In the embodiment shown in FIG. 4A, the photodiode 408 is connected to a transimpedance amplifier 412 which converts the weak current generated in the photodiode 408 to a higher current that is capable of driving various circuits in a fiber-optic controller (such as controllers 318, 322 and 328 in FIG. 3) associated with receiving optical signals through a photodiode 408. The photodiode 408 and transimpedance 412 circuitry is connected to analog interface pins 411. The analog interface pins 411 are accessible by circuitry external to the optical module 320.

The optical module 320 further includes memory 336. In the example shown, the memory 336 is an EEPROM. Those of skill in the art however, will recognize that other types of memory may be used including but not limited to PROM, flash memory and the like. The memory 336 stores digital diagnostic information including operating parameters of the laser diode 402, the photodiode 408, transimpedance amplifier 412, optical connectors 404,410 and the like. This digital diagnostic information is specific to the individual laser diode 402 photodiode 408, transimpedance amplifier 412, and/or optical connectors 404,410. Alternatively, the digital diagnostic information may be specific to ratings for a group of components to which a particular component belongs. The memory 336 may include various parameters such as but not limited to the following:

Setup functions. These generally relate to the required adjustments made on a part-to-part basis in the factory to allow for variations in component characteristics such as laser diode threshold current.

Identification. This refers to information identifying the optical module type, capability, serial number, and compatibility with various standards. While not standard, additional information such as sub-component revisions and factory test data may also be included.

Eye safety and general fault detection. These functions are used to identify abnormal and potentially unsafe operating parameters and to report these to a host and/or perform laser shutdown, as appropriate.

Temperature compensation functions. For example, compensating for known temperature variations in key laser characteristics such as slope efficiency.

Monitoring functions. Monitoring various parameters related to the optical module operating characteristics and environment. Examples of parameters that may be monitored include laser bias current, laser output power, receiver power levels, supply voltage and temperature. Ideally, these parameters are monitored and reported to, or made available to, a host device and thus to the user of the optical module.

Power on time. The optical module's control circuitry may keep track of the total number of hours the optical module has been in the power on state, and report or make this time value available to a host device.

Margining. "Margining" is a mechanism that allows the end user to test the optical module's performance at a known deviation from ideal operating conditions, generally by scaling the control signals used to drive the optical module's active components.

Other digital signals. A host device may configure the optical module so as to make it compatible with various requirements for the polarity and output types of digital inputs and outputs. For instance, digital inputs are used for transmitter disable and rate selection functions while outputs are used to indicate transmitter fault and loss of signal conditions. The configuration values determine the polarity of one or more of the binary input and output signals. In some optical modules, these configuration values can be used to specify the scale of one or more of the digital input or output values, for instance by specifying a scaling factor to be used in conjunction with the digital input or output value.

Other digital diagnostic information may also be stored in the memory 336. Examples of testing optical elements and storing diagnostic information in the memory 336 is discussed in United States Patent Application Publication No. 2002/0149812-, published Oct. 17, 2002, which is incorporated herein by reference.

Digital diagnostic information and representations of operating characteristics may be stored in the memory 336 where the digital diagnostic information and representations of operating characteristics relates to a group of components with a particular rating. In this way, when components are manufactured, the components may be tested and divided into an appropriate group depending on their operating characteristics exhibited during testing. A memory 336 with appropriate digital diagnostic information and/or digital representation of operating characteristics for a particular category may then be matched with a component that falls in that category as a result of testing.

Alternative embodiments may be implemented as a laser module 324 such as in FIG. 4B or a photosensitive module 326 such as in FIG. 4C. These embodiments implement the laser or photodiode functionality respectively of the optical module 320. Notably, while the photosensitive module 326 is shown implementing a photodiode 412, other photosensitive components may be used as well.

Figure 5:
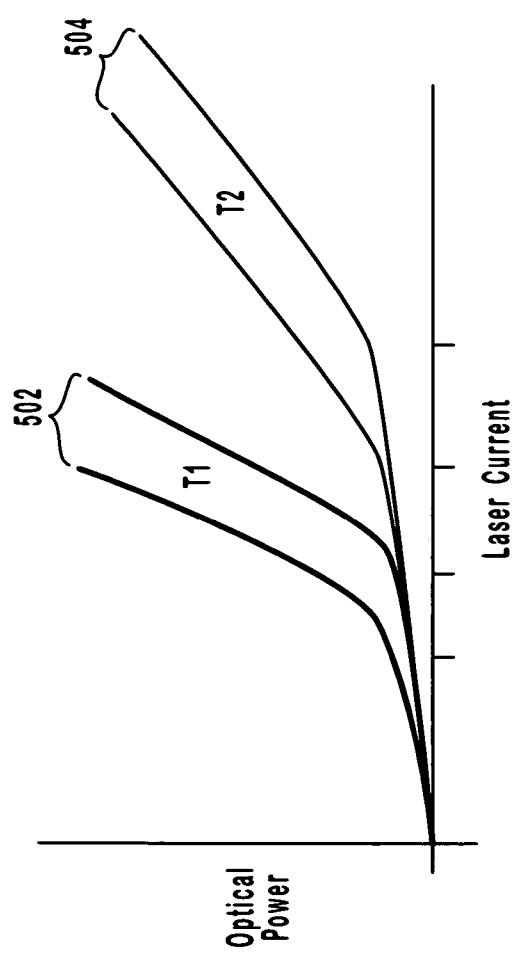
FIG. 5 illustrates exemplary operating curves for a laser diode.

Referring now to FIG. 5 one exemplary operating characteristic of a laser diode such as laser diode 402 in FIG. 4 is illustrated. FIG. 5 is a graph that correlates laser current running through laser diodes to optical power output by the laser diodes. Generally, the operating characteristics of laser diodes differ from laser diode to laser diode. However, the operating characteristics will generally fall within a certain range of operating characteristics. The graph of FIG. 5 illustrates this principle as two ranges of laser current to optical power curves 502 and 504. The first range 502 illustrates a range of laser current to optical power for laser diodes when the laser diodes are operated at a first temperature labeled T1. As temperature increases to a higher temperature T2, the same laser diodes will exhibit different optical characteristics such as the second range 504.

Similar to the graph shown in FIG. 5, other graphs exist for components such as photodiodes. The graph for a photodiode may, in one example; graph received optical power to a current generated in the photodiode as a function of a bias current across the photodiode. Still other operating characteristics of laser diodes and photodiodes may be generated. These graphs may include, for example, bias voltages and currents as variables on the graph.

It is often desirable to precisely control the optical output of laser diodes. Likewise, it is often desirable to correlate the signal received from a photodiode to a specific current output to other circuitry. Conventionally, laser drivers are matched to laser diodes such that a digital signal fed into the laser driver will cause a specific optical power to be generated by the photodiode. Likewise, post amplifiers connected to photodiodes have heretofore been matched with the photodiode to cause a specific current to be generated when an optical signal is received by the photodiode. However, embodiments of the present invention contemplate allowing randomly selected controllers such as the controllers 318, 322, 328 shown in FIG. 3 to be matched with randomly selected optical modules, laser modules and photosensitive modules such as those shown in FIG. 3.

Thus, some embodiments of the present invention allow for information such as operating characteristics to be stored in memory such as memory 336 shown in FIGS. 4A, 4B and 4C, such that the operating characteristics are accessible by a controller, such as through a digital interface like the digital connections 334 shown in FIG. 3. These digital connections are, in one embodiment, an I²C or MDIO bus. In this way the controller can adapt driving signals or amplifiers to the specific optical module, laser module, and/or photosensitive module that the controller is connected to.

Notably, the memory 336 may be updateable by a host device such as the network client 204. As noted above, the memory may be used in digital diagnostic functions and thus may have need to be updated as operating characteristics or conditions change. Thus, the host device or an optical controller can update entries in the memory 336 as needed.

Some embodiments contemplate methods for generating calibration data or operating characteristics to be stored in memory 336 (FIG. 3) for access by controller modules in adapting to optical modules, laser modules, and/or photosensitive modules connected to the controller module. While the methods may describe various steps or acts in a particular order, embodiments do not necessarily require, unless expressly stated, that the steps or acts be performed in the order set forth herein. Some embodiments are particularly well suited to performing the steps or acts in any appropriate order or substantially simultaneously.

One such method includes testing optical components, such as laser diodes photodiodes, transimpedance amplifiers, connectors, fibers, etc that are to be installed in or that are already installed in an optical module. Testing may include operating the optical components at various operating points to determine characteristics of the optical components. The operating points may include, in one example, different operating temperatures. The optical components may be tested at the maximum and minimum expected operating temperatures. Other operating points may be different bias voltages and currents. Those skilled in the art will appreciate that still other operating points may be tested to generate operating characteristics.

A digital representation of the operating characteristics is generated. Generating the digital representation can be accomplished in several different ways while still remaining within the scope of embodiments of the present invention. For example, in one embodiment, coefficients may be generated such as those in a Legendre polynomial or other expansion coefficients that represent an operating characteristic graph such as that shown in FIG. 5. In an alternative example, the digital representation may be end points of a curve. By examining FIG. 5, it will be noted that as laser current increases there is a point at which the optical power is substantially linear with respect to further increases in laser current. Thus, to represent a linear portion of the graph, only two end points need to be digitized. Alternatively, a single endpoint and a slope may be digitized. Lasers are generally only operated in the linear portion because that is the portions of the operating range where lasers laze. Thus, including only the linear portions is often sufficient.

Once the operating characteristics of the optical components have been digitized, the optical operating characteristics are stored in memory such as memory 336. As noted above, this memory may be any type of suitable memory including PROM, EEPROM, flash memory and the like.

Referring once again to FIG. 3, although not pictured, the optical module 320 and laser module 324 may include a monitor photodiode to regulate the operation of the laser 402, 416. The monitor photodiode provides an indication of the amount of optical power being emitted by a laser diode. A separate feedback interface may be included to connect the monitor photodiode to a controller such as the controllers 318, 322, 328 shown in FIG. 3. Using information from the monitor photodiodes and the memory 336, the controllers 318, 322, 328 and regulate control of the laser is the optical module 320 and laser module 324. Additionally, feedback from the monitor photodiode may be used to generate digital data to update the memory 336.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A controller positioned internal to a host computer housing and external to an optical module received by a host computer, the controller comprising:
   an analog interface adapted to couple to the optical module for delivering and/or receiving signals to and/or from the optical module; and
   a digital interface adapted to couple to a memory internal to the optical module, the digital interface being configured to:
      receive digital diagnostic parameters including a digital representation of one or more operating characteristics of the optical module, the digital diagnostic parameters including setup, identification, eye safety and general fault detection, and temperature compensation;
      deliver and/or receive signals to and/or from the optical module based on at least one of the digital diagnostic parameters; and
      deliver and/or receive signals complying with an appropriate one of multiple standards and/or protocols that can each be implemented by the controller to and/or from the optical module depending on a type of optical module.

2. The controller of claim 1, wherein the controller is at least one of a Fibre Channel, a 10 gigabit Ethernet, Infiniband and a SONET controller.

3. The controller of claim 1, wherein the analog and digital interfaces are adapted to connect to traces on a printed circuit board, the printed circuit board being positioned internal to the host computer housing.

4. The controller of claim 1, wherein the analog and digital interfaces are adapted to connect to pluggable modules.

5. The controller of claim 1, wherein the digital interface is adapted to connect to at least one of an MDIO or I²C bus.

6. The controller of claim 1, wherein the analog interface is adapted to:
   couple to a laser of the optical module; and
   deliver driving signals to the laser based on one or more of the digital diagnostic parameters.

7. The controller of claim 1, wherein the analog interface is adapted to:
   couple to a photodiode of the optical module; and
   receive signals from the photodiode based on one or more of the digital diagnostic parameters.

8. The controller of claim 1, wherein the multiple standards and/or protocols include a Fibre Channel, a 10 gigabit Ethernet, an Infiniband and a SONET standard and/or protocol.

9. A computer system comprising a central processing unit (CPU) and multiple controllers of claim 1, wherein:
   a first of the controllers is adapted to operate according to a Fibre Channel standard and/or protocol; and
   a second of the controllers is adapted to operate according to a 10 gigabit Ethernet standard and/or protocol.

10. The computer system of claim 9, wherein a third of the controllers is adapted to operate according to a SONET standard and/or protocol.

11. The computer system of claim 9, wherein the computer further comprises:
    a memory management unit (MMU) coupled to the multiple controllers and coupled to the CPU, a cache memory, and a main memory of the computer.

12. The computer system of claim 9, wherein the multiple controllers are fabricated on a single silicon wafer chip.

13. A controller positioned internal to a host computer housing and external to a laser module received by a host computer, the controller comprising:
    an analog interface adapted to couple to a laser module and configured to deliver signals to the laser module; and
    a digital interface adapted to:
       couple to a memory of the laser module;
       receive a digital representation of operating characteristics of the laser module; and
       deliver signals to the laser module based on the digital representation of operating characteristics,
    wherein:
       the signals comply with an appropriate one of multiple standards and/or protocols depending on a type of the laser module; and
       the operating characteristics include a setup function, identification information, an eye safety and general fault detection function, and a temperature compensation.

14. The controller of claim 13, wherein the multiple standards and/or protocols include a Fibre Channel, a 10 gigabit Ethernet, an Infiniband, and a SONET standard and/or protocol.

15. A computer system comprising:
    a central processing unit (CPU);
    a cache memory;
    a main memory of the computer system;
    multiple controllers of claim 13; and
    a memory management unit (MMU) coupled to the multiple controllers and coupled to the CPU, the cache memory, and the main memory, wherein:
       a first of the controllers is adapted to operate according to a Fibre Channel standard and/or protocol,
       a second of the controllers is adapted to operate according to a 10 gigabit Ethernet standard and/or protocol,
       a third of the controllers is adapted to operate according to a SONET standard and/or protocol, and
       the multiple controllers are fabricated on a single silicon wafer chip.

16. The controller of claim 13, wherein the analog and digital interfaces are adapted to connect to traces on a printed circuit board positioned internal to the host computer housing.

17. A controller positioned internal to a host computer housing and external to an optical module received by a host computer, the controller comprising:
    an analog interface adapted to couple to a transimpedance amplifier of a photosensitive module and adapted to receive an analog electrical signal representative of an optical signal received by the photosensitive module; and
    a digital interface adapted to:
       couple to a memory of the photosensitive module; and
       receive from the memory a digital representation of operating characteristics of the photosensitive module based on the digital representation of operating characteristics, wherein:
the signals comply with an appropriate one of multiple standards and/or protocols depending on a type of the photosensitive module; and
the operating characteristics include a setup function, identification information, an eye safety and general fault detection function, a temperature compensation function, a monitoring function, power on time, and margining.

18. The controller of claim 17, wherein the multiple standards and/or protocols include a Fibre Channel, a 10 gigabit Ethernet, an Infiniband, and a SONET standard and/or protocol.

19. A computer system comprising:
a central processing unit (CPU);
a cache memory;
a main memory of the computer system;
multiple controllers of claim 17; and
a memory management unit (MMU) coupled to the multiple controllers and coupled to the CPU, the cache memory, and the main memory, wherein:
a first of the controllers is adapted to operate according to a Fibre Channel standard and/or protocol,
a second of the controllers is adapted to operate according to a 10 gigabit Ethernet standard and/or protocol,
a third of the controllers is adapted to operate according to a SONET standard and/or protocol, and
the multiple controllers are fabricated on a single silicon wafer chip.

20. The controller of claim 17, wherein the analog and digital interfaces are adapted to connect to traces on a printed circuit board positioned internal to the host computer housing.

* * * * *

UNITED STATES PATENT AND TRADEMARK OFFICE
CERTIFICATE OF CORRECTION

PATENT NO.        : 9,065,571 B2                                    Page 1 of 1
APPLICATION NO.   : 10/929978
DATED             : June 23, 2015
INVENTOR(S)       : Levinson It is certified that error appears in the above-identified patent and that said Letters Patent is hereby corrected as shown below:

Specification

In Column 5, Line 38, delete "lap" and insert -- up --, therefor.

In Column 6, Line 63, delete "modules 1320" and insert -- modules 320 --, therefor.

In Column 8, Line 27, delete "information" and insert -- information, --, therefor.

In Column 9, Line 21, delete "photodiode 412," and insert -- photodiode 408, --, therefor.

Signed and Sealed this
Twelfth Day of July, 2016

Michelle K. Lee
*Director of the United States Patent and Trademark Office*